United States Patent
Dethlefsen

(10) Patent No.: US 11,771,066 B2
(45) Date of Patent: Oct. 3, 2023

(54) METHOD FOR RAISING FISH IN A RECIRCULATED AQUACULTURE SYSTEM

(71) Applicant: GRAINTEC A/S, Vejle (DK)

(72) Inventor: Markus Wied Dethlefsen, Vejle (DK)

(73) Assignee: GRAINTEC A/S, Vejle (DK)

( * ) Notice: Subject to any disclaimer, the term of this patent is extended or adjusted under 35 U.S.C. 154(b) by 0 days.

(21) Appl. No.: 18/016,148

(22) PCT Filed: Jul. 15, 2021

(86) PCT No.: PCT/DK2021/050240
§ 371 (c)(1),
(2) Date: Jan. 13, 2023

(87) PCT Pub. No.: WO2022/012728
PCT Pub. Date: Jan. 20, 2022

(65) Prior Publication Data
US 2023/0210094 A1     Jul. 6, 2023

(30) Foreign Application Priority Data

Jul. 15, 2020  (DK) .......................... PA 2020 70488

(51) Int. Cl.
*A01K 61/85*      (2017.01)
*A01K 61/10*      (2017.01)
(Continued)

(52) U.S. Cl.
CPC .............. *A01K 61/85* (2017.01); *A01K 61/10* (2017.01); *A01K 63/042* (2013.01); *A01K 63/045* (2013.01); *A01K 63/065* (2013.01)

(58) Field of Classification Search
CPC .... A01K 61/85; A01K 63/045; A01K 63/042; A01K 61/10
See application file for complete search history.

(56) References Cited

U.S. PATENT DOCUMENTS 3,565,043 A * 2/1971 Carmouche .......... A01K 63/003
                                                    119/228
4,221,187 A * 9/1980 Casey .................... A01K 63/10
                                                    119/232
(Continued)

FOREIGN PATENT DOCUMENTS

GB        2173981 A    10/1986
NO        149372 B     1/1984
(Continued)

OTHER PUBLICATIONS

International Search Report issued in corresponding PCT Application No. PCT/DK2021/050240, dated Sep. 28, 2021, pp. 1-3.
(Continued)

*Primary Examiner* — Monica L Perry
(74) *Attorney, Agent, or Firm* — Robinson & Cole LLP

(57) ABSTRACT

The present invention relates to a method of raising fish in a recirculated aquaculture system which includes a fish holding unit in fluid communication with a water supply, the fish holding unit containing a volume of water defining a water depth, and having an osmotic concentration, an oxygen concentration, a temperature, and a pH. The method includes providing a flow of non-recirculated water to the water supply, the non-recirculated water being different from the water in the fish holding unit with respect to the osmotic concentration, the oxygen concentration, the CO2 concentration, the N2 concentration, the NH4+ concentration, the temperature and/or the pH, providing feed pellets, adding the feed pellets to the non-recirculated water and hydraulically transporting the feed pellets to the fish holding unit. The invention also relates to a RAS facility.

13 Claims, 1 Drawing Sheet

(51) Int. Cl.
*A01K 63/04* (2006.01)
*A01K 63/06* (2006.01)

(56) References Cited

U.S. PATENT DOCUMENTS

| | | |
|---|---|---|
| 6,447,681 B1 | 9/2002 | Carlberg et al. |
| 2003/0213745 A1 | 11/2003 | Haerther et al. |
| 2006/0112895 A1 | 6/2006 | Olivier et al. |
| 2010/0236137 A1* | 9/2010 | Wu .......................... C10L 1/19 |
| | | 554/8 |
| 2016/0200601 A1* | 7/2016 | Clark ...................... C02F 1/685 |
| | | 210/96.1 |
| 2018/0125041 A1 | 5/2018 | Holm et al. |

FOREIGN PATENT DOCUMENTS

| | | |
|---|---|---|
| NO | 883015 L | 1/1990 |
| WO | 02056676 A1 | 7/2002 |
| WO | 2011064538 A1 | 6/2011 |
| WO | 2015067955 A1 | 5/2015 |
| WO | 2016160141 A1 | 10/2016 |
| WO | 2020143890 A1 | 7/2020 |

OTHER PUBLICATIONS

International Preliminary Report on Patentability issued in corresponding PCT Application No. PCT/DK2021/050240, dated Jun. 10, 2022, pp. 1-18.

* cited by examiner

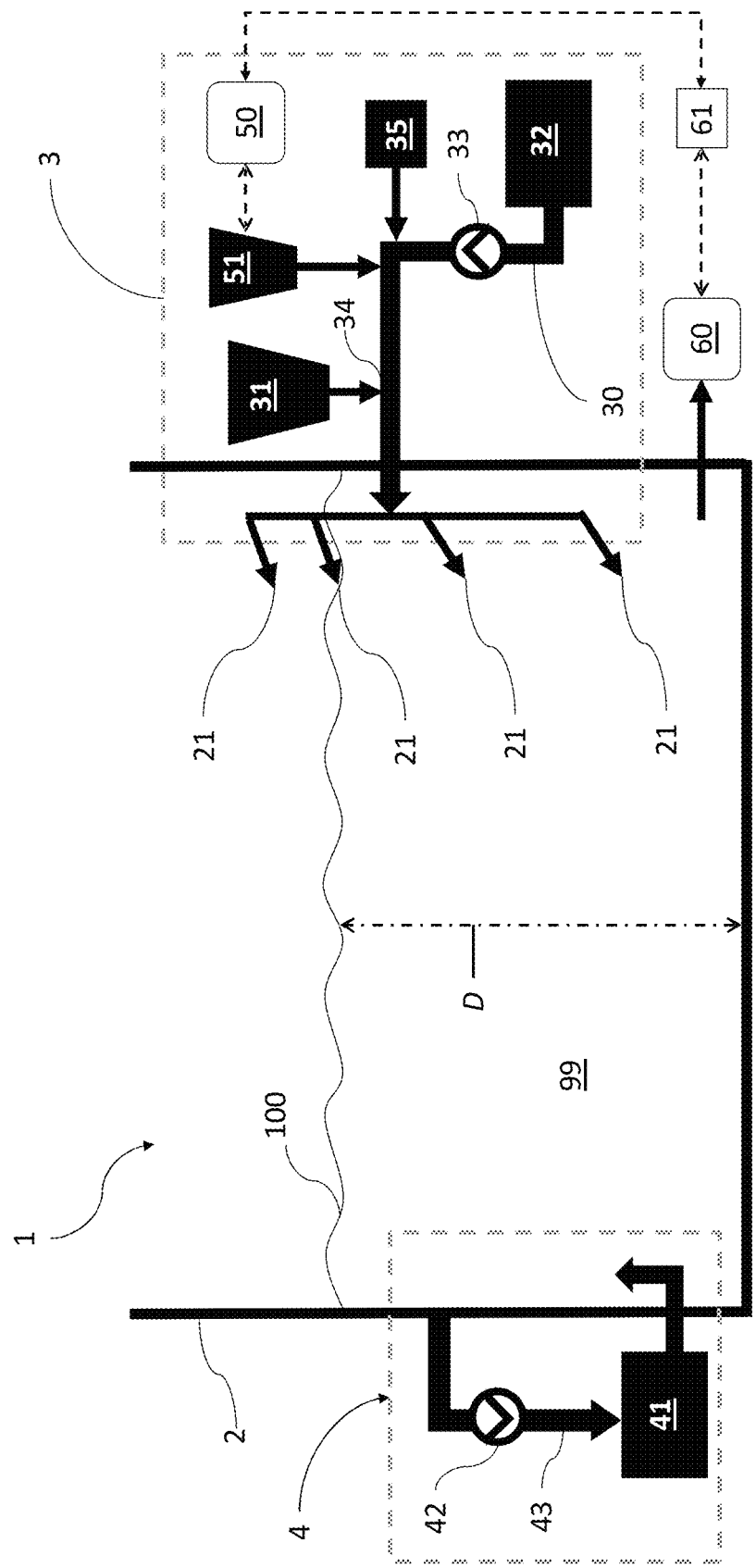

METHOD FOR RAISING FISH IN A RECIRCULATED AQUACULTURE SYSTEM

CROSS REFERENCE TO RELATED APPLICATIONS

The instant application is a U.S. National Stage application of and claims priority to PCT/DK2021/050240, filed on Jul. 15, 2021, which is a PCT application of and claims priority to DK Application No. PA 2020 70488, filed on Jul. 15, 2020, the subject matter of both aforementioned applications are hereby incorporated by reference in their entireties.

TECHNICAL FIELD

The present invention relates to a method and a system for raising fish, more specifically to a recirculated aquaculture system (RAS) and a method of transporting feed to the RAS.

BACKGROUND

Farmed fish and shellfish are dependent on receiving all required nutrients in the feed delivered to their aquaculture site, e.g. cages or pens out in the sea, flow-throughs in connection to a river or pond, or on-land sites such as RAS facilities. In most apparatuses used for today's transportation of fish feed to the feeding site, pneumatic or mechanical principles are prevalent. Typically, in case of pneumatic conveying, the feed pellets are blown by means of either fans or air compressors. It is well-known that pneumatic transport of feed pellets easily can cause pellet degradation and generate dust and fines up to 7%, as described in WO2015067955. Also, the pipe used for transporting the feed is worn due to friction between pipe wall and pellets.

Steel pipes are heavy, require additional support and are expensive, whereas plastic pipes are cheap, but need more maintenance and release micro-plastic to the feed and the aquaculture site. The generation of fines and dust from the feed pellets has a considerable cost and must be minimized as much as possible. It corresponds to lost feed and essential/limiting nutrients, and it pollutes the surrounding environment. In case of RAS facilities, it additionally stresses the mechanical and/or (micro)biological filters used for cleaning the water in the aquaculture system. Another well-known problem is that some fish, especially salmon, are picky eaters, often spitting out feed or simply not eating the feed if they do not find it palatable. The feed spat out or not immediately eaten by the fish may dissolve over time, further burdening the mechanical and/or (micro)biological filters of the RAS facility.

An alternative way of transporting fish feed is by hydraulic transport which is known from WO2002056676 which relates to a system utilizing hydraulic feeding to deliver the feed below the water surface, especially relevant for demersal fish species such as catfish, turbot, and halibut. Hydraulic transport is also known from WO2011064538 and WO2015067955 which describe how hydraulic transport of aquaculture feed is used for impregnating the dry fish feed pellets with water to improve their digestibility. Impregnating the feed will constitute a mass transport, not only of water into the feed, but also nutrients and oils from the feed leaking out in the water.

NO149372 discloses an apparatus for transporting feed to aquaculture enclosures floating in the sea (sea cages). The size of such sea cages is limited by effective transport of feed to the sea cages, and in the apparatus, feed is contacted with a high-speed water jet to launch the feed through the air into the sea cage, spreading the feed across as large a part of the sea-cage as possible.

WO2016160141 discloses a modularised shrimp production system. The system comprises a production sub-unit module, a RAS module, a feed distribution module, and a computer control module. The system is modularised and integrated to form a multi-phasic synchronous super-intensive shrimp production system controlled by a custom designed cyber-physical platform. The system is considered to provide aquaculture of shrimps using a total water volume per weight of shrimp produced significantly less than with conventional techniques.

A loss of nutrients is not desired as it necessitates the use of additional feed to provide the necessary nutrients to the fish, and thus is an additional cost.

A leak of oils from the feed is not optimal but can be tolerated when the fish are bred in open water. However, in e.g. RAS facilities the oil will settle in the filters of the system, reducing their efficiency. This may result in an increased amount of $CO_2$ in the cleaned water, which have the effect that the fish grow slower. Alternatively, the density of fish has to be lowered, which is also disadvantageous.

Therefore, it is desired to develop a more gentle and efficient way of transporting feed, especially in RAS facilities, which may also serve the feed in a manner which is palatable to the fish.

SUMMARY

It is the object of the invention to provide a method for improved, gentle transportation of feed, which may also serve the feed in a manner which is palatable to the fish. Thus, according to a first aspect of the invention this and other objects are achieved by a method of raising fish in a recirculated aquaculture system (RAS), the RAS comprising a fish holding unit in fluid communication with a water supply, the fish holding unit containing a volume of water defining a water depth, the water having an osmotic concentration, a conductivity, an oxygen concentration, a $CO_2$ concentration, a $N_2$ concentration, a $NH_4^+$ concentration, a temperature, and a pH, the method comprising the steps of: providing a flow of non-recirculated water to the water supply, the non-recirculated water being different from the water in the fish holding unit with respect to at least one of the osmotic concentration, the conductivity, the oxygen concentration, the $CO_2$ concentration, the $N_2$ concentration, the $NH_4^+$ concentration, the temperature and the pH; providing feed pellets; and adding the feed pellets to the non-recirculated water and hydraulically transporting the feed pellets to the fish holding unit.

Any aquaculture system with recirculated water may, in the context of the invention, be referred to as a "recirculated aquaculture system" (RAS), and the method may be used with any RAS system. Such aquaculture system may hold any suitable volume of water, but typically hold up to $10^{12}$ $m^3$ of water. A typical fish holding unit may comprise between 200 $m^3$ to 50,000 $m^3$ of water. Typically, industrial aquaculture systems comprise several fish holding units. The fish holding unit may be smaller fish holding units of up to 5,000 $m^3$, medium sized fish holding units of up to 15,000 $m^3$ or larger fish holding units of e.g. 50,000 $m^3$, such as 25,000 to 35,000 $m^3$, or combinations thereof. RAS facilities typically have a conduit for providing clean water to a fish tank, and the method may readily be used in existing RAS facilities, e.g. by connecting a conduit to a fish holding unit of a RAS facility, which may allow for hydraulic transport of feed pellets to the fish holding unit.

The RAS typically further comprises a recirculation conduit. The recirculation conduit is described further below.

The water supply is in fluid communication with the fish holding unit, and the water supply will define an inlet point. Since the feed pellets are supplied with the non-recirculated water in the water supply, the inlet point may also be referred to as a feeding site. The water supply may comprise or be a conduit and an outlet of the conduit defines the inlet point. The water supply may be in direct fluid communication with the fish holding unit, such that feed pellets are hydraulically transported and added directly to the water in the fish holding unit.

In the method, feed pellets are hydraulically transported to the fish holding unit. Hence, the feed pellets are hydraulically transported to the fish holding unit by the non-recirculated water. In the context of the invention, the term "feed pellets" means feed appropriate for the fish in the fish holding unit in any solid form. For example, the feed pellets may be granules or particles having a size in the range of 0.1 mm to 50 mm or more, and the granules may be single particles or agglomerated. The feed pellets may dry, moist or semi-moist feed or even chops of marine animals, e.g. fish, shellfish, or marine plants. In a specific embodiment, the feed pellets are to the non-recirculated water are any type of feed pellets described in PCT/DK2020/050057, which is hereby incorporated by reference. For example, the feed pellets may comprise a protein, a feed stabiliser, water and a fatty acid component with the fatty acid and the water being comprised in the same phase, wherein the feed pellets on a dry matter basis comprises 25% w/w or more of the fatty acid component, and wherein the content of water is at least 30% w/w of the feed pellets.

In the method, non-recirculated water is provided to the water supply of the fish holding unit. In the context of the invention, the term "non-recirculated water" means water that has not been recirculated in the RAS. The non-recirculated water may also be referred to as freshly supplied water or clean water, and the terms may be used interchangeably. The water in the fish holding unit and the non-recirculated water will have at least an osmotic concentration, a conductivity, an oxygen concentration, a temperature, and a pH, and in the fish holding unit these will be appropriate for the fish to be raised in the fish holding unit. In the context of the invention, "oxygen concentration" refers to dissolved $O_2$. The water in the fish holding unit and the non-recirculated water may also be described in terms of a $CO_2$ concentration, a $N_2$ concentration, a $NH_4^+$ concentration, and these may be monitored and adjusted in the embodiments of the invention. The terms the osmotic concentration, the conductivity, the oxygen concentration, the $CO_2$ concentration, the $N_2$ concentration, the $NH_4^+$ concentration, the temperature, and the pH may also collectively be referred to as "parameters", and when a "parameter" is mentioned in the context of the invention, it may be any of the osmotic concentration, the conductivity, the oxygen concentration, the $CO_2$ concentration, the $N_2$ concentration, the $NH_4^+$ concentration, the temperature, and the pH, and when "parameters" are mentioned in the context of the invention, it may be two or more of the osmotic concentration, the conductivity, the oxygen concentration, the $CO_2$ concentration, the $N_2$ concentration, the $NH_4^+$ concentration, the temperature, and the pH. The parameters may be monitored or determined using any method known within the art. For example, the osmotic concentration may be recorded using any kind of osmometer, e.g. a membrane osmometer. Likewise, the conductivity may be recorded using any kind of conductivity meter, the temperature may be recorded using any kind of thermometer, $CO_2$, $N_2$ and $NH_4^+$ may be recorded using any kind of spectrophotometer or chromatography, or any kind of spectroscopy, e.g. near-infrared spectroscopy or mass spectroscopy, and the pH may be recorded using any kind of pH meter. The method may involve monitoring and adjusting $CO_2$ and $NH_4^+$. When dissolved in water, these convert to and between other forms, i.e. $CO_3^{2-}$, $HCO_3^-$ and $NH_3$, respectively, depending on the pH, and in the context of the invention, all forms of the respective compounds may be monitored and/or adjusted, as appropriate. Several of the relevant parameters can influence other parameters. For example, the osmotic concentration will affect the conductivity, and $CO_2$ and $NH_4^+$ will affect the pH, and may also affect both the osmotic concentration and the conductivity. It is therefore preferred that if a parameter is monitored, and in particular also adjusted, the potentially concomitantly affected parameter will also be monitored, and it may be adjusted independently in order to obtain a specific value for the concomitantly affected parameter. The water, especially in the fish holding unit, may also be described with respect to a Biochemical Oxygen Demand (BOD), a Chemical Oxygen Demand (COD), and/or a dry matter, and these are also considered parameters in the context of the invention. The BOD, COD and/or the dry matter are representative for the content of geosmin in the water, and these parameters should normally be as low as possible. The water in the fish holding unit may further be described in terms of a content of $H_2S$ and turbidity. As for the BOD, COD and/or the dry matter, these should also be as low as possible. Therefore, the method of the invention may include monitoring and adjusting one or more of the BOD, the COD, the dry matter content, $H_2S$ and the turbidity. $H_2S$ may be measured using any kind of spectrophotometer or chromatography, or any kind of spectroscopy, e.g. near-infrared spectroscopy or mass spectroscopy, and the content will normally be expressed in the unit μg/kg. The turbidity may be measured using any appropriate technology, e.g. a nephelometer, and the turbidity will normally be expressed in the unit Nephelometric Turbidity Unit (NTU).

The fish may be any fish as desired, for example the fish may be salt water or fresh water fish. Despite lower salinity of fresh water, the advantages of the invention apply equally to fresh water fish and salt water fish. Correspondingly, the osmotic concentration will typically be provided from salts, especially NaCl, found in natural water, e.g. sea water. The osmotic concentration may also be referred to as "salinity" and the two terms may be used interchangeably. Moreover, the osmotic concentration, the oxygen concentration, the $CO_2$ concentration, the $N_2$ concentration, the $NH_4^+$ concentration, the temperature, and the pH of the water in collection may be said to provide a composition, and in the context of the present invention, a "composition", when used to describe water, will refer to one or more of the osmotic concentration, the conductivity, the oxygen concentration, the $CO_2$ concentration, the $N_2$ concentration, the $NH_4^+$ concentration, the temperature, and the pH. However, the water may also contain other constituents, which may be considered with the term "composition". In particular, the composition of the non-recirculated water differs from the composition of the water in the fish holding unit with respect to at least one of the osmotic concentration, the oxygen concentration, the $CO_2$ concentration, the $N_2$ concentration, the $NH_4^+$ concentration, the temperature and the pH.

The water supply may have any design as desired. For example, the water supply may include or be any kind of conduit, e.g. a tube or pipe or an open channel. The water supply is in fluid communication with the fish holding unit, and the water supply may thus have a conduit with an exit end within the volume defined by the fish holding unit. For example, the exit end of the tube may be above, at, or below a water surface in the fish holding unit. The water supply may also include a reservoir for clean water. In particular, clean water may be adjusted for at least one of the parameters to be different from the corresponding parameters of the water in the fish holding unit before being supplied to the fish holding unit as non-recirculated water.

The RAS appropriate for the method has a fish holding unit. The fish holding unit may have any shape and size as desired. For example, the fish holding unit may be an open, e.g. upwards open, tank, or the fish holding unit may be a closed tank, e.g. a tank with a lid or the like.

Fish are sensitive to the water properties, and in general a fish can sense a difference and react to the difference. In particular, a fish will learn to relate a sensed difference to an associated observation. Thus, by adding feed pellets to the non-recirculated water and supplying the non-recirculated water with the feed pellets to the fish holding unit, the fish will recognise that feed pellets are made available at the inlet point due to the difference between the non-recirculated water and the water in the fish holding unit. The present inventors have surprisingly found that by adding the feed pellets with the non-recirculated water, fish in the fish holding unit will eat a larger proportion of the feed pellets compared to when the feed pellets are added without any water, i.e. in dry form to the water to the fish holding unit, or when feed pellets are added with recirculated water. Thereby, a more efficient operation of a RAS facility is provided where a larger proportion of the feed pellets is converted to fish biomass.

A RAS will typically have a water recirculation conduit, which may contain any type of cleaning operation or unit operation for adjusting the water in the recirculation conduit. The recirculation conduit is in fluid communication with the fish holding unit and recirculates water (recirculated water) from the fish holding unit back to the fish holding unit. The recirculation conduit being in fluid communication with the fish holding unit defines a recirculation outlet point where water is withdrawn from the fish holding unit, and a recirculation inlet point where recirculated water enters back into the fish holding unit. The recirculation conduit is separate from a conduit of the water supply. The recirculation inlet point is separate from the inlet point, also denoted as the feeding site, which defined by the water supply. Even though the water in the recirculation conduit may be adjusted, e.g. with respect to the osmotic concentration, the oxygen concentration, the $CO_2$ concentration, the $N_2$ concentration, the $NH_4^+$ concentration, the temperature and/or the pH, the inventors have observed that due to the much larger volumetric flow in the recirculation conduit, fish in the fish holding unit will not recognise the inlet of the recirculation conduit in the fish holding unit as a feeding site, even when the water composition is adjusted. In a typical RAS facility, water may be recycled, especially the water recycling may be continuous, and the amount of recycled water may in the range of 95% to 99.9% or more. Correspondingly, non-recirculated water may be added to the fish holding unit to retain the mass balance. Without being bound by theory, the present inventors believe that adjusting the water in the recirculation conduit sufficiently for the fish to react to the difference will be detrimental to the health of the fish, and the conversion of feed pellets in the recirculated water will not be as efficient as when the feed pellets are supplied with the non-recirculated water. In particular, the amount of non-recirculated water in the water supply compared to the amount of water in the fish holding unit is so small, e.g. typically less than 5%, e.g. less than 1%, less than 0.5%, less than 0.2%, less than 0.1%, or less than 0.01% of the water in the fish tank, that the non-recirculated water may have a significantly different composition with respect to the salinity, the oxygen concentration, the $CO_2$ concentration, the $N_2$ concentration, the $NH_4^+$ concentration, the temperature and the pH compared to the water in the fish holding unit without causing a detrimental effect to the fish in the fish holding unit. Thereby the method of the invention provides better control of the RAS by adding feed pellets with the non-recirculated water.

In an embodiment, non-recirculated water is supplied, e.g. continuously or batch-wise, to the fish holding unit to maintain a mass balance in the fish holding unit due to water that is lost from the RAS. In the case of batch-wise supply of non-recirculated water, there may be a pause in the supply of non-recirculated water, such as 1 to 24 hours of no non-recirculated water being added to the RAS. As such, the recirculation of water in the RAS may be up to 100% for several hours followed by a batch-wise supply of non-recirculated water. Supplying the non-recirculated water batch-wise may allow for the accumulation of a greater volume of non-recirculated water in a container before the batch of non-recirculated water is released in the RAS system. Thus, using batch-wise supply of non-recirculated water may allow for a greater flow of non-recirculated water for hydraulic transport of feed to the fish holding unit. Also, in batch-wise supply of non-recirculated water, the non-recirculated water may be adjusted batch-wise for one or more of the parameters.

It is preferred that the non-recirculated water is only adjusted with respect to one or more of the parameters compared to the water of the fish holding unit at the time of feeding the fish, e.g. the one or more parameters are adjusted shortly before adding the feed pellets and the adjustment may be maintained as long as feed pellets are added. Likewise, the parameters for the non-recirculated water should correspond to the parameters of the water in the fish holding tank, when the fish are not being fed. Thereby, the advantage of having the fish eat a larger proportion of the feed pellets can be maintained more efficiently than when non-recirculated water being adjusted with respect to one or more of the parameters is supplied to the fish holding unit without feed pellets. In an embodiment, non-recirculated water adjusted with respect to one or more of the parameters but not containing feed pellets is not supplied to the fish holding unit.

The recirculation and treatment of water in the fish holding units are typically highly dependent on the fish density in the fish holding units, but also the quality of feed pellets. Fish density is the number of fish per volume of water in the fish holding units. Water is normally recirculated and treated to maintain a good water quality for the fish. If the fish density is low the recirculation of water may be low, e.g. 0.5 to 5 times per hour, whereas if the fish density is high the water in the fish holding units is recirculated up to 20 times per hour. Similarly, the water may be recycled less. A recirculated flow of water between 400 m³/hour to 100,000 m³/hour per tank can therefore be expected, and the volume of non-recirculated will typically be in the range of 0.01% to 1% of this.

The effect of the invention can be enhanced by actively controlling the composition of the non-recirculated water. For example, the method may comprise the step of adjusting one or more of the osmotic concentration, the conductivity, the oxygen concentration, the $CO_2$ concentration, the $N_2$ concentration, the $NH_4^+$ concentration, the temperature and the pH of the non-recirculated water, e.g. compared to the corresponding values of the water in the fish holding unit. The adjustment of the non-recirculated water preferably results in one of more of i) an osmotic concentration difference of at least 1 mOsm/kg;
ii) a conductivity difference of at least 0.01 μS/cm;
iii) an oxygen concentration difference of at least 0.05 mg/kg;
iv) a $CO_2$ concentration difference of at least 0.05 mg/kg;
v) a $N_2$ concentration difference of at least 0.05 mg/kg;
vi) a $NH_4^+$ concentration difference of at least 0.05 mg/kg;
Vii) a temperature difference of at least 0.1° C.; and
Viii) a pH difference of at least 0.1
compared to the water of the fish holding unit. Specific ranges for the parameters are provided in Table 1.

TABLE 1

| Parameter difference | Differences | | | |
|---|---|---|---|---|
| Osmotic concentration | 1 mOsm/kg | 2 mOsm/kg | 5 mOsm/kg | 10 mOsm/kg |
| Conductivity | 0.01 μS/cm | 0.05 μS/cm | 0.1 μS/cm | 0.5 μS/cm |
| Oxygen | 0.05 mg/kg | 0.1 mg/kg | 0.5 mg/kg | 1 mg/kg |
| $CO_2$ | 0.05 mg/kg | 0.1 mg/kg | 0.5 mg/kg | 1 mg/kg |
| $N_2$ | 0.05 mg/kg | 0.1 mg/kg | 0.5 mg/kg | 1 mg/kg |
| $NH_4^+$ | 0.05 mg/kg | 0.1 mg/kg | 0.5 mg/kg | 1 mg/kg |
| Temperature | 0.1 ° C. | 0.5 ° C. | 1 ° C. | 2 ° C. |
| pH | 0.1 | 0.15 | 0.2 | 0.25 |

Although the parameter differences in Table 1 have been presented in terms of adjusting the non-recirculated water to result in the tabulated parameter differences, it is understood that in some embodiments a source of non-recirculated water may be available which satisfies one or more of the parameter differences in Table 1. Hence, in some embodiments the method comprises providing a flow of non-recirculated water to the water supply, the non-recirculated water being different from the water in the fish holding unit with respect to at least one of the parameter differences listed in Table 1.

The water in the fish holding unit may also be monitored with respect to the $H_2S$ and the turbidity, and these may be adjusted in the non-recirculated water, e.g. with differences between the non-recirculated water and the water in the fish holding unit as defined in Table 2.

TABLE 2

| Parameter difference | Differences | | | |
|---|---|---|---|---|
| Turbidity | 0.05 NTU | 0.1 NTU | 0.5 NTU | 2 NTU |
| $H_2S$ | 0.05 μg/kg | 0.1 μg/kg | 0.5 μg/kg | 2 μg/kg |

The parameters may be adjusted as desired. For example, the osmotic concentration may be adjusted by increasing or decreasing the concentration of NaCl or optionally also other salts found in natural waters. Likewise, the pH may be adjusted using compounds typically found in nature. For example, the pH may be increased using alkali or earth alkali salts of carbonate, e.g. $Na_2CO_3$, $K_2CO_3$, $CaCO_3$, $MgCO_3$, or ammonia, and the pH may be decreased using acids such as HCl or $NH_4Cl$. The conductivity will typically be adjusted concomitantly with the adjustment of the osmotic concentration and the pH. It is preferred that the conductivity is not adjusted independently but that both the osmotic concentration and the pH are adjusted simultaneously in order to adjust the conductivity. The salinity, the oxygen concentration, the temperature and the pH of the non-recirculated water may be adjusted depending on the type of fish raised in the fish holding unit. An even better effect can be obtained when one or more of the osmotic concentration, the oxygen concentration, the $CO_2$ concentration, the $N_2$ concentration, the $NH_4^+$ concentration, the temperature and the pH are monitored for the water in the fish holding unit and the corresponding parameters are adjusted in the non-recirculated water based on the monitored values of the respective one or more of the salinity, the oxygen concentration, the $CO_2$ concentration, the $N_2$ concentration, the $NH_4^+$ concentration, the temperature and the pH of the water in the fish holding unit.

Thus, in a preferred embodiment, the method comprises monitoring one or more of an osmotic concentration, a conductivity, an oxygen concentration, a $CO_2$ concentration, a $N_2$ concentration, a $NH_4^+$ concentration, a temperature, and a pH of the water in the fish holding unit, adjusting one or more of the osmotic concentration, the oxygen concentration, the $CO_2$ concentration, the $N_2$ concentration, the $NH_4^+$ concentration, the temperature and the pH of the non-recirculated water to provide at least one of:

i) an osmotic concentration difference of at least 1 mOsm/kg;
ii) a conductivity difference of at least 0.01 μS/cm;
iii) an oxygen concentration difference of at least 0.05 mg/kg;
iv) a $CO_2$ concentration difference of at least 0.05 mg/kg;
v) a $N_2$ concentration difference of at least 0.05 mg/kg;
vi) a $NH_4^+$ concentration difference of at least 0.05 mg/kg;
vii) a temperature difference of at least 0.1° C.; and
viii) a pH difference of at least 0.1
compared to the water of the fish holding unit. In this embodiment, an even larger proportion of the feed pellets will be eaten by the fish than when the properties of the water in the fish holding unit are not monitored.

When feed pellets are supplied to a fish tank via recirculated water, the recirculated water may contain substances, such as geosmin or microorganism, which can decrease the palatability of the feed which, and which may inevitably be present in recirculated water, since they are not easily removed from the water even though the recirculated water may be cleaned before adding feed pellets. This disadvantage is avoided when the feed pellets are added to non-recirculated water. Thus, by adding feed pellets to the non-recirculated water, the inventors, without being bound by any theory, believe that the fish find the feed more palatable when served in non-recirculated water than in recirculated water.

In an embodiment, an appetising agent which increases the appetite of the fish is added to the flow of non-recirculated water, in particular upstream of the feeding point. The appetising agent may be krill meal or krill by-products, low temperature fish meal, fish oil, shrimp meal or by-products. Certain parameters, e.g. the BOD, the COD, the dry matter content, $H_2S$ and the turbidity should be as low as possible in the fish holding unit. When the parameters are monitored, an appetising agent can be included with the feed pellets, especially based on the values of the respective parameters, in order improve the appetite of the fish being fed. It is also contemplated to monitor the BOD, the COD, the dry matter content, $H_2S$, and/or the turbidity of the water in the fish holding unit, and if relevant the non-recirculated may be adjusted with respect to one or more of the BOD, the COD, the dry matter content, $H_2S$, and the turbidity. Monitoring of the BOD, the COD, and/or the dry matter content are especially relevant in the context of geosmin and either may reflect an undesirable amount of geosmin. In a particular embodiment, the BOD, the COD, and/or the dry matter content are monitored in the fish holding unit, as representative for the geosmin content, and an appetising agent is added to the non-recirculated water based on the recorded values of the BOD, the COD, and/or the dry matter content. Such an appetising agent may alleviate the appetite-reducing effect of geosmin or other substance which may be present in the water recycled in the RAS facility. Without being bound by theory, it is believed that the fragrant properties of the appetising agent outcompete the sensory impact of geosmin, but that when an appetising agent is added to a recirculated water, a much larger amount of appetising agent is needed to outcompete the odour of geosmin, Thus, by adding an appetising agent with a flow of non-recirculated water free from geosmin a lower amount of the appetising agent is required thereby providing a cheaper method of raising fish. Any appetising agent may be used, and the appetising agent may for example be volatile, unstable or degradable.

Additionally, the method improves the transportation of the feed pellets, since the feed pellets are transported more gently than by pneumatic or mechanical transport methods and the amount of generated dust and fines is thereby reduced.

A further advantage of using non-recirculated water is that the biosecurity of the entire RAS facility is increased, i.e. the risk of spreading infections and diseases within the aquaculture system is minimized. Poor water quality is the main source of spreading diseases and is a breeding ground for development of toxic gasses such as $H_2S$. Using non-recirculated water, the BOD and the COD can be tightly controlled.

All of these advantages may apply to a method used for aquaculture system facilities that operate with full or partial internal recirculation of water. Any fish may be raised according to the method. For example, the fish may demersal fish species such as catfish, turbot, and halibut, or the fish may be pelagic fish species including salmon, salmonids, trouts, carps, tilapias, pangasius, and others. The non-recirculated water may be adapted to the species of fish which are farmed. For saltwater fish the water is adapted to resemble seawater, whereas for freshwater fish, the water is adapted to resemble freshwater.

The osmotic concentration difference may be due to one or more of concentration differences in salts, especially salts commonly occurring in water bodies such as NaCl or $CaCO_3$.

The term hydraulic transport is used to describe solid-liquid flow. In this context the solid-liquid flow is comprised of feed, e.g. granules or pellets, and water. Hence, in the context of the invention, the feed being hydraulically transported means that the feed pellets are transported in a conduit, such as pipe, tube or channel, by liquid, in particular the non-recirculated water, to the fish holding unit.

Hydraulically transporting the feed pellet in the conduit to the fish holding unit may allow for control of the inflow conditions, such as the position of the inlet point in the fish holding unit, which inlet point is the outlet of the conduit, and the dispersion of the solid-liquid flow at the inlet point. By hydraulically transporting the fed in a conduit, the inlet point may thus be positioned as desired in relation to the water surface. Furthermore, using a conduit may allow for low dispersion of the inflowing feed pellets in non-recirculated water at the inlet point which may increase the likelihood of a forming a local zone in the fish holding with different water parameters due to the non-recirculated water. Conversely, when using high dispersion transport means such as spraying or jet-ejection, the non-recirculated water may be spread across a large part of the fish holding unit, potentially diluting the effect of the different water parameters.

A property difference may preferably be obtained without reaching salt, $CO_2$, $N_2$, $NH_4^+$, oxygen, temperature or pH differences, which may stress the fish or otherwise not be suitable for raising fish. However, when the difference is found only in the non-recirculated water, the difference will generally not be large enough to negatively affect the fish in the fish holding unit.

In a preferred embodiment, the flow of non-recirculated water has Reynolds number below 500,000. The Reynolds number may below 400,000, such as below 300,000, 200,000, 100,000 or 75,000. In a preferred embodiment, the flow of non-recirculated water has Reynolds number in the range of 500 to 50,000. At such Reynolds numbers, the flow of non-recirculated water may be laminar.

Such low Reynolds number ensure that when the non-recirculated water enters the fish holding unit at an inlet point, the non-circulated water is more slowly mixed with the water of the fish holding unit. The slower mixing enhances the effect of having a property difference between the non-recirculated water and the water of the fish holding unit, such as a difference in one or more of the osmotic concentration, the conductivity, the oxygen concentration, the $CO_2$ concentration, the $N_2$ concentration, the $NH_4^+$ concentration, the temperature and the pH between the non-recirculated water and the water of the fish holding unit. As the volume of the non-recirculated water is small compared to the volume of water in the fish holding unit, the Reynolds number of the non-recirculated water has a great influence on how fast the non-recirculated water is mixed with the water of the fish holding unit. As such, flows of non-recirculated water with large Reynolds numbers should preferably be avoided, as they will result in the non-recirculated water being mixed too rapidly with the water of the fish holding unit when the non-recirculated water enters the fish holding unit an inlet point, diminishing the effect of the feed pellets being served in non-recirculated water. The skilled person knows how to regulate the flow of water to obtain suitable Reynolds numbers.

In some embodiments, the velocity of the water flow in the conduit is in the range of 0.5 to 2.5 meter/sec.

The inlet point, or the feeding site, may be at the water surface, above the water surface, partially below the water surface or below the water surface in the fish holding unit. The inlet point may have any angle in respect to the fish holding unit, e.g. the feed pellets may be delivered upwards, downwards, or from the side in respect to gravity, or any angle in between. In addition, the inlet point may be at any depth of the fish holding unit.

In a preferred embodiment, feed pellets are hydraulically transported to the fish holding unit below and above or at the water surface, simultaneously. This may allow the fish to consume the feed pellets in a less stressful manner, as they will not have to compete for the feed pellets that are only located at the surface.

In a preferred embodiment, feed pellets are hydraulically transported to the fish holding unit partially below, or preferably below a water surface of the water of the fish holding unit.

An inlet point above the surface of the water will make the flow non-recirculated water fall into the water of the fish holding unit. When the inlet point is partially below or below the water surface, only a part of or none of the non-recirculated water will fall into the water of the fish holding unit. Limiting or eliminating the fall decreases the rate of mixing of non-recirculated water with the water of the fish holding unit. Hence, when the inlet point is partially below or below the water surface, the effect of using non-recirculated water with a parameter difference is enhanced.

In a preferred embodiment, the method further comprises a step of cleaning the non-recirculated water before adding the feed pellets to the flow of water.

Cleaning should be understood to comprise any appropriate cleaning methods for removing or disintegrating microbial organisms or viruses, or removing or disintegrating unpalatable substances, such as compounds or proteins produced by microorganisms. Such cleaning means may be micro filtering, reverse osmosis, distillation, heat treatment, Ultra Violet (UV) treatment, ozone treatment, or use of chemicals that removes or binds substances present in the water by e.g. ion exchange, chelation, oxidation, or precipitation.

In another aspect the invention relates to a recirculated aquaculture system (RAS), the system comprising: a fish holding unit in fluid communication with a water supply via a conduit, the fish holding unit containing a volume of water defining a water depth, the water having an osmotic concentration, an oxygen concentration, a $CO_2$ concentration, a $N_2$ concentration, a $NH_4^+$ concentration, a temperature, and a pH; the recirculated aquaculture system further comprising a data processing unit configured to receive data from one or more of an osmotic concentration measuring unit, a conductivity measuring unit, an oxygen concentration measuring unit, a $CO_2$ concentration measuring unit, a $N_2$ concentration measuring unit, a $NH_4^+$ concentration measuring unit, a temperature measuring unit, and a pH measuring unit contained in the fish holding unit; wherein the conduit is configured to receive data from the data processing unit, and to provide at least one of:

i) an osmotic concentration difference of at least 1 mOsm/kg;
ii) a conductivity difference of at least 0.01 μS/cm;
iii) an oxygen concentration difference of at least 0.05 mg/kg;
iv) a $CO_2$ concentration difference of at least 0.05 mg/kg;
v) a $N_2$ concentration difference of at least 0.05 mg/kg;
vi) a $NH_4^+$ concentration difference of at least 0.05 mg/kg;
vii) a temperature difference of at least 0.1° C.; and
viii) a pH difference of at least 0.1 compared to the water of the fish holding unit; and wherein the conduit comprises a feed loading section, so that when feed is added into the system at the feed loading section it is hydraulically transported in the water via the conduit to the fish holding unit at an inlet point.

The system may achieve the same objects achieved by the method of the present invention and further objects.

The conduit may be configured to provide water with the differences i) to viii) compared to the water in the fish holding unit.

The fish holding unit may have any shape as desired suitable of containing a liquid. It may e.g. be a cylindrically shaped unit, or a cuboid shaped unit. It may be a tank, vessel, aquarium, basin, or the like made from any material. It could also be a pond or basin in which some filtration and/or cleaning is used. The upper side of the fish holding unit may be open, or it may have a removable or fixed lid. When the system is used as desired, i.e. for raising fish, there is water in the aquaculture system. Most of the water is typically comprised in the fish holding unit which is where the fish are raised.

The conduit can be coupled to a single fish holding unit, or it may be coupled to two or more fish holding units. Feed may be added to a single flow of non-recirculated water at the feed loading section and may then be distributed to a plurality of individual fish holding units. Feeding to one or more inlet points may occur simultaneously, individually, sequentially or continuously. The inlet point may be an outlet or exit end of the conduit. The conduit may be direct fluid communication with the fish holding unit, such that the outlet is located within the volume defined by the fish holding unit.

The conduit may have any suitable size and shape for containing a flow of water containing pellets. Usually the conduit takes the form a cylinder, but it may also be a halved cylinder, or an elliptic cylinder. In some embodiments, the conduit is a cylinder with a diameter in the range of 20 mm to 100 mm, such as 22, 50, or 80 mm. In some embodiments, the conduit is a cylinder with a changing diameter in the range of 20 mm to 100 mm.

The conduit may comprise regulating means, which regulates the amount of water which may flow to in the conduit. Such regulating means may be any suitable means such as one or more of a valve, a pump, and an aperture. The water supply may be from a pre-pressurized source, such that when water from the source is allowed to flow into the conduit, as suitable flow of water may be obtained. In this case, the means for regulating the flow of water may be only the pressurized source of fresh water.

In a preferred embodiment, the conduit comprises means for regulating the flow of water, and the conduit and the means for regulating the flow of water are configured for allowing a flow of water with a Reynolds number below 500,000, preferably below 200,000, more preferably below 100,000, more preferably below 50,000, such as in the range of 500 to 50,000.

In a preferred embodiment, the recirculated aquaculture system (RAS) has an inlet point partially below or below the water surface of the fish holding unit.

In a preferred embodiment, the conduit is configured for cleaning-in-place.

Cleaning-in-place is well known in the art. Using a conduit with cleaning-in-place allows for the conduit to be cleaned without disassembly. Such cleaning has the benefit of maintaining the effects of using non-recirculated water for serving the feed, without significant downtown that would otherwise result from having to disassemble the conduit for cleaning.

The RAS typically also has a recirculation conduit in addition to the conduit. The recirculation conduit is configured for recirculating water from the fish holding unit and back to fish holding unit.

The water supply may be for supplying non-recirculated water to the fish holding unit through the conduit, whereby the feed added at the feed loading section is hydraulically transported via the conduit by the non-recirculated water to the fish holding unit at the inlet point.

BRIEF DESCRIPTION OF DRAWINGS

In the following description embodiments of the invention will be described with reference to the schematic drawings, in which FIG. 1 shows a schematic illustration of a recirculating aquaculture system according to one embodiment of the invention.

DETAILED DESCRIPTION

Referring to FIG. 1, a schematic illustration of a recirculating aquaculture system (RAS) 1 of an embodiment of the present invention is shown. In general, elements having the same or analogous function have the same reference numerals. The RAS 1 comprises a fish holding unit 2 in the form of a tank with an upper opening. When the fish holding unit 2 is used for the intended use, i.e. for raising fish, it comprises a volume of water 99 forming a water surface 100 and a depth of water D, and fish (not shown). A water supply 3 is in fluid communication with the fish holding unit 2. In the depicted embodiment, the water supply 3 comprises a water reservoir 32 containing clean water, which provides water to the water supply 3 via a conduit 30. A feed storage unit 31 in the form of a silo is located adjacent a feed loading section 34 located downstream of the water reservoir 32. The feed storage unit 31 supplies feed pellets to the feed loading section 34. The feed loading section 34 comprises feed loading means (not shown) such as a venture injector, for leading feed pellets into the water supply 3 via the conduit 30. The amount of feed pellets may be adjusted by the time that the opening is open. Alternatively, the feed pellets may be measured volumetrically or gravimetrically before loading it into the water. The arrows illustrate conduits in the recirculating aquaculture system 1 and the intended direction of the water flow.

Feed pellets (not shown) are transported hydraulically to the fish holding unit 2 at an inlet point 21. In FIG. 1, the RAS 1 is depicted with a plurality of inlet points 21, but a RAS 1 of the invention may have any number of the depicted inlet points 21. The inlet points 21 are configured to distribute non-recirculated water with feed pellets from the water supply 3 at different depths in the fish holding unit 2 via the conduit 30. One inlet point 21 is located above the water surface 100, another inlet point 21 is located at the water surface 100 and two inlet points 21 are located in the water 99 of the fish holding unit 2 at different depths. Such designs are beneficial for different types of fish in the fish holding unit 2, e.g. demersal fish or pelagic fish feeding at different depths. The embodiment shown allows for hydraulic transportation of feed using non-recirculated water to several depths/locations in the fish holding unit 2. In this particular embodiment, the inlet point 21 is located in the water 99 below the water surface 100.

A water pump 33 is located upstream of the inlet point 21 and provides a flow of non-recirculated water in the conduit 30 from the water reservoir 32, and feed is added to the flow of non-recirculated water, the feed is hydraulically transported to the inlet point 21 in the water 99 of the fish holding unit 2. The water pump 33 is shown in a specific location, but it can be located anywhere in the water supply 3 downstream of the water reservoir 32.

The RAS has a recirculating system 4 comprising a cleaning system 41. The recirculating system 4 comprises a cleaning system pump 42, capable of recirculating the water 99 0.5 to 5 times per hour. Water from the fish holding unit 2 is recirculated in the recirculation system 4 in a recirculation conduit 43. The cleaning system 41 may comprise any unit operations appropriate for a RAS, e.g. one or more of a bio-filtration unit, a solids removal unit, a pH control unit, a temperature control unit, an Ultra Violet (UV) treatment unit, an oxygenation unit, a $CO_2$ stripping unit, and an ozone treatment unit. Details not shown or described are readily apparent to the person skilled in the art.

The RAS 1 comprises a monitoring system 60 mounted on or in the fish holding unit 2 for monitoring the parameters of the water 99 in the fish holding unit 2. The monitoring system 60 comprises a membrane osmometer. a conductivity meter, a thermometer, and a pH meter. The specific components in the monitoring system 60 can be decided specifically for a RAS 1, and it may comprise more or fewer components than indicated. In an embodiment, the monitoring system 60 can also monitor the Biochemical Oxygen Demand (BOD), the Chemical Oxygen Demand (COD), the dry matter, the $H_2S$ content and/or the turbidity of the water 99 in the fish holding unit 2.

The water supply 3 comprises an adjustment system 50 for adjusting the parameters of the non-recirculated water. The adjustment system 50 comprises a data processing unit (not shown), which controls an additive supply 51. The adjustment system 50 and the additive supply 51 together control the parameters of the non-recirculated water. The additive supply 51 contains reservoirs for salts, specifically NaCl and $Na_2CO_3$, for controlling the osmotic concentration and a reservoir for HCl for lowering the pH. The pH may be increased using $Na_2CO_3$, and the osmotic concentration will concomitantly be modified with HCl. All of NaCl, HCl and $Na_2CO_3$ will also affect the conductivity. The additive supply 51 may also include an oxygenation unit with an $O_2$ reservoir for adjusting the $O_2$ concentration of the non-recirculated water. The adjustment system 50 may also include a $CO_2$ stripping unit. A $CO_2$ stripping unit can also adjust the pH. The temperature is monitored with a thermometer, and the temperature of the non-recirculated water can be increased or decreased using a heating exchanger (not shown), increased using a heating element, cooled using a peltier element or the like (not shown).

In a specific embodiment, the adjustment system 50 will receive data relating to COD, BOD and/or dry matter of the water 99 in the fish holding unit 2 as representative for the content of geosmin of the water 99 in the fish holding unit 2. The adjustment system 50 may optionally also receive data relating to the $H_2S$ content and/or the turbidity. The adjustment system 50 can then add an appetising agent from the additive supply 51 depending on the estimated concentration of geosmin in the water 99, or based on the $H_2S$ content and/or the turbidity, in the fish holding unit 2.

It is also possible for the water supply system 3 to comprise a cleaning unit 35 for regulating the non-recirculated water, e.g. in the conduit 30. The cleaning unit 35 is configured for removing particles, unwanted substances, or microorganism or viruses or a combination thereof. The cleaning unit 35 may for example include a bio-filtration unit, a solids removal unit, an UV treatment unit, and an ozone treatment unit.

The RAS 1 comprises a data processing unit 61 configured to obtain data from the monitoring system 60 and control the adjustment system 50 based on the data obtained. In FIG. 1 data flow is indicated with dotted lines. The data flow may be via cabled connections between the monitoring system 60, the data processing unit 61, and the adjustment system 50, and the additive supply 51, or the data flow may be wireless.

In general, the adjustment system 50 will receive data from the data processing unit 61 to control the composition of the non-recirculated water based on data for the water 99 in the fish holding unit 2. When the fish in the fish holding unit 2 are not being fed, the non-recirculated water will be adjusted to correspond to the water 99 in the fish holding unit 2. Prior to feeding, and also during feeding, the non-recirculated water will be adjusted so that at least one of the osmotic concentration, the conductivity, the oxygen concentration, the $CO_2$ concentration, the $N_2$ concentration, the $NH_4^+$ concentration, the temperature and the pH are different from the corresponding parameter in the water 99 in the fish holding unit 2.

The invention is not limited to the embodiments shown and described in the above, but various modifications and combinations may be carried out.

EXAMPLES

Example 1—Hydraulic Transport of Feed in a RAS

Feed (pellets) stored in a feed storage unit were either added via a lobe pump or an ejector to a conduit on a RAS. The amount of water to pellets was varied (shown below as the water-to-pellet weight based ratio) as well as the water flow. The liquid loss, loss caused by generation of fines and the retention time were measured. The results are shown below in table 3.

TABLE 3

|  | Lobe | | | | Ejector | |
| --- | --- | --- | --- | --- | --- | --- |
| Trial | 1 | 2 | 3 | 4 | 5 | 6 |
| Loss, liquid [%] | 8.9 | 5.0 | 4.1 | 4.1 | 1.3 | 1.9 |
| Fines [%] | 0.95 | 0.80 | 0.80 | 0.40 | 0.040 | 0.060 |
| Total loss [%] | 9.9 | 5.8 | 4.9 | 4.5 | 1.3 | 2.0 |
| Speed [m/s] | 1.3 | 1.4 | 0.70 | 0.70 | 1.1 | 2.6 |
| Retention time [s] | 35 | 33 | 65 | 65 | 40 | 17 |
| Volume flow [m³/h] | 9.2 | 10 | 5.0 | 5.0 | 46 | 15 |
| Water-to-pellet ratio | 17 | 10 | 20 | 50 | 46 | 15 |

In Table 3, "Lobe" denotes the use of a lobe pump (which sucks up the pellets from a feed storage unit, where the pellets are stored in water). "Ejector" denotes the use of an ejector for the addition of pellets to the conduit (which sucks the pellets down into the water flow in the conduit). The ejector is arranged after the pump of the conduit, whereby the feed pellets avoid having to go through the pump of the conduit.

"Loss, liquid" denotes the weight loss from e.g. oil which leaves the pellets in the water flow of the conduit.

"Fines" denotes the feed pellets weight loss from e.g. crumbles, dust and torn off parts of the pellets, which are lost in the water flow of the conduit.

"Speed" denotes the flow velocity of the water flow with the pellets.

"Retention time" denotes the time that the pellets are retained in the water flow of the conduit.

Conclusion:

Hydraulic transport of feed pellets affords a very low generation of fines and a low liquid loss, even at different water-to-pellet ratios.

Example 2—Feeding in Recirculated Water Vs Non-Recirculated Water

Feeding by way of recirculated water and non-recirculated water was compared in two RAS where the respective fish holding units had a diameter of 19 meter and water depth of 7 meters.

In the first RAS, feed pellets were added to the recirculated water in the water recirculation conduit and hydraulically transported to the fish holding unit. The feed pellets were added after mechanical and biological filtration of the recirculated water.

In the second RAS, feed pellets were added to a non-recirculated water, fresh water, and hydraulically transported to the fish holding unit.

The salinity and temperature of the fresh water were both lower than the recirculated water. The recirculated water had a salinity of about 3% (mass) and a dry matter content of 40.000 mg/L (mostly salt) and the salinity and temperature of the recirculated water corresponded to the water in the fish holding units. In comparison the dry matter content of the fresh water was 190 mg/L. The operator further noted that the recirculated water had an odour of geosmin.

The following was observed by the operator:

Increased appetite of the fish being fed by way of fresh water compared to those fed by way of recirculated water. The fish flocked at the feeding point to a greater extent in the RAS using fresh water feeding. The fish flocked to the feeding point before feed pellets were added to the fresh water, when the conduit was flushed with fresh water, indicating that the fish noticed the difference in the water properties at the feeding point caused by the inflow of fresh water.

When the fish flock at the feeding point, it increases the likelihood of the feeds pellet being eaten and reduces the residence time of the feed pellet in the fish holding unit. This both provides better utilisation of the feed, i.e. a greater proportion being eaten, and may reduce the effect that non-eaten feed may have on the water quality, such as turbidity.

LIST OF REFERENCE NUMERALS

1 Recirculating aquaculture system
2 Fish holding unit
21 Inlet point
3 Water supply
30 Conduit
31 Feed storage unit
32 Water reservoir
33 Pump
34 Feed loading section
35 Cleaning unit 4 Recirculation system
41 Cleaning system
42 Cleaning system pump
43 Recirculation conduit
50 Adjustment system
51 Additive supply
60 Monitoring system
61 Data processing unit
99 Water
100 Water surface
D Water depth

What is claimed is:

1. A method of raising fish in a recirculated aquaculture system comprising a fish holding unit in fluid communication with a water supply, the fish holding unit containing a volume of water defining a water depth, the water having an osmotic concentration, a conductivity, an oxygen concentration, a $CO_2$ concentration, a $N_2$ concentration, a $NH_4^+$ concentration, a temperature, and a pH, the recirculated aquaculture system further comprising a recirculation conduit, the method comprising the steps of:
   providing a flow of non-recirculated water to the water supply, the non-recirculated water being different from the water in the fish holding unit with respect to at least one of the osmotic concentration, the conductivity, the oxygen concentration, the $CO_2$ concentration, the $N_2$ concentration, the $NH_4^+$ concentration, the temperature and the pH;
   providing feed pellets; and
   adding the feed pellets to the non-recirculated water and hydraulically transporting the feed pellets to the fish holding unit.

2. The method of raising fish in a recirculated aquaculture system according to claim 1, wherein the non-recirculated water is different by at least one of:
   i) an osmotic concentration difference of at least 1 mOsm/kg;
   ii) a conductivity difference of at least 0.01 μS/cm;
   iii) an oxygen concentration difference of at least 0.05 mg/kg;
   iv) a $CO_2$ concentration difference of at least 0.05 mg/kg;
   v) a $N_2$ concentration difference of at least 0.05 mg/kg;
   vi) a $NH_4^+$ concentration difference of at least 0.05 mg/kg;
   vii) a temperature difference of at least 0.1° C.; and
   viii) a pH difference of at least 0.1 compared to the water in the fish holding unit.

3. The method of raising fish in a recirculated aquaculture system according to claim 1, wherein the non-recirculated water has an osmotic concentration difference of at least 1 mOsm/kg compared to the water in the fish holding unit.

4. The method of raising fish in a recirculated aquaculture system according to claim 1, further comprising the step of adjusting one or more of the osmotic concentration, the oxygen concentration, the $CO_2$ concentration, the $N_2$ concentration, the $NH_4^+$ concentration, the temperature and the pH of the non-recirculated water.

5. The method of raising fish in a recirculated aquaculture system according to claim 4, wherein the adjustment of the non-recirculated water results in at least one of:
   i) an osmotic concentration difference of at least 1 mOsm/kg;
   ii) a conductivity difference of at least 0.01 μS/cm;
   iii) an oxygen concentration difference of at least 0.05 mg/kg;
   iv) a $CO_2$ concentration difference of at least 0.05 mg/kg;
   v) a $N_2$ concentration difference of at least 0.05 mg/kg;
   vi) a $NH_4^+$ concentration difference of at least 0.05 mg/kg;
   vii) a temperature difference of at least 0.1° C.; and
   viii) a pH difference of at least 0.1 compared to the water of the fish holding unit.

6. The method of raising fish in a recirculated aquaculture system according to claim 1, further comprising the step of monitoring one or more of the osmotic concentration, the conductivity, the oxygen concentration, the $CO_2$ concentration, the $N_2$ concentration, the $NH_4^+$ concentration, the temperature and the pH of the water in the fish holding unit.

7. The method of raising fish in a recirculated aquaculture system according to claim 1, wherein the flow of non-recirculated water has a Reynolds number in the range of 500 to 50,000.

8. The method of raising fish in a recirculated aquaculture system according to claim 1, wherein the feed pellets are hydraulically transported to the fish holding unit partially below, or below a water surface (100) of the water of the fish holding unit.

9. The method of raising fish in a recirculated aquaculture system according to claim 1, further comprising a step of cleaning the non-recirculated water before adding the feed pellets to the non-recirculated water, the cleaning comprising one or more of micro filtering, heat treatment, Ultra Violet (UV) treatment, and ozone treatment.

10. A recirculated aquaculture system comprising:
   a fish holding unit in fluid communication with a water supply via a conduit, the fish holding unit containing a volume of water defining a water depth, the water having an osmotic concentration, an oxygen concentration, a $CO_2$ concentration, a $N_2$ concentration, a $NH_4^+$ concentration, a temperature, and a pH,
   the recirculated aquaculture system further comprising a recirculation conduit, and
   the recirculated aquaculture system further comprising a data processing unit configured to receive data from one or more of an osmotic concentration measuring unit, a conductivity measuring unit, an oxygen concentration measuring unit, a $CO_2$ concentration measuring unit, a $N_2$ concentration measuring unit, a $NH_4^+$ concentration measuring unit, a temperature measuring unit, and a pH measuring unit contained in the fish holding unit,
   wherein the conduit is configured to receive data from the data processing unit, and to provide water with at least one of:
   i) an osmotic concentration difference of at least 1 mOsm/kg;
   ii) a conductivity difference of at least 0.01 μS/cm;
   iii) an oxygen concentration difference of at least 0.05 mg/kg;
   iv) a $CO_2$ concentration difference of at least 0.05 mg/kg;
   v) a $N_2$ concentration difference of at least 0.05 mg/kg;
   vi) a $NH_4^+$ concentration difference of at least 0.05 mg/kg;
   vii) a temperature difference of at least 0.1° C.; and
   viii) a pH difference of at least 0.1
   compared to the water of the fish holding unit, and
   wherein the conduit comprises a feed loading section, so that when feed is added into the system at the feed loading section it is hydraulically transported in the water via the conduit to the fish holding unit at an inlet point.

11. The recirculated aquaculture system according to claim 10, wherein the conduit is a cylinder with a diameter in the range of 20 mm to 100 mm.

12. The recirculated aquaculture system according to claim 10, wherein the conduit is configured for cleaning-in-place.

13. The recirculated aquaculture system according to claim 10, wherein the water supply is configured to supply non-recirculated water to the fish holding unit through the conduit, whereby the feed added at the feed loading section is hydraulically transported via the conduit by the non-recirculated water to the fish holding unit at the inlet point.

* * * * *